United States Patent
Yoon

(10) Patent No.: US 9,663,109 B2
(45) Date of Patent: May 30, 2017

(54) VEHICLE CLUTCH CONTROL METHOD

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/885,141

(22) Filed: Oct. 16, 2015

(65) Prior Publication Data

US 2016/0332627 A1    Nov. 17, 2016

(30) Foreign Application Priority Data

May 12, 2015   (KR) .................. 10-2015-0065854

(51) Int. Cl.
| | |
|---|---|
| *B60W 10/02* | (2006.01) |
| *B60W 10/18* | (2012.01) |
| *B60W 30/186* | (2012.01) |
| *B60W 10/184* | (2012.01) |
| *B60W 30/18* | (2012.01) |

(52) U.S. Cl.
CPC .......... *B60W 30/186* (2013.01); *B60W 10/02* (2013.01); *B60W 10/184* (2013.01); *B60W 30/18063* (2013.01); *B60W 30/18118* (2013.01); *B60W 2510/186* (2013.01); *B60W 2550/142* (2013.01)

(58) Field of Classification Search
None
See application file for complete search history.

(56) References Cited

U.S. PATENT DOCUMENTS

| | | | | |
|---|---|---|---|---|
| 2006/0004506 | A1* | 1/2006 | Stehle | B60W 10/02 701/67 |
| 2011/0045947 | A1* | 2/2011 | Kaltenbach | B60K 6/48 477/5 |
| 2013/0240315 | A1* | 9/2013 | Tao | F16H 61/688 192/3.54 |
| 2013/0282247 | A1 | 10/2013 | Burtch | |

FOREIGN PATENT DOCUMENTS

| | | |
|---|---|---|
| JP | 2010144851 | 1/2010 |
| JP | 2012-91603 | 5/2012 |
| KR | 20140010319 | 1/2014 |

* cited by examiner

*Primary Examiner* — Edwin A Young
(74) *Attorney, Agent, or Firm* — Brinks Gilson & Lione

(57) ABSTRACT

A vehicle clutch control method includes an incline detecting step of detecting an incline of a road surface when the vehicle is in a creep hold state, a first determining step of determining whether the detected incline is greater than a first set value, and a first control step of opening the clutch and operating an electronic stability program (ESP) brake when the incline is greater than the first set value.

7 Claims, 2 Drawing Sheets

VEHICLE CLUTCH CONTROL METHOD

CROSS-REFERENCE TO RELATED APPLICATIONS

Figure 1:
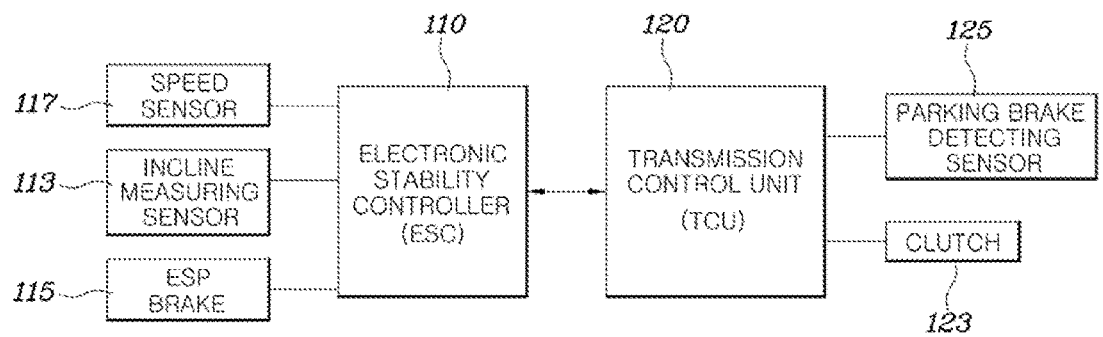

This application claims the benefit of Korean Patent Application No. 10-2015-0065854, filed on May 12, 2015, which is hereby incorporated by reference in its entirety.

FIELD

The present disclosure relates to a vehicle clutch control method for reducing heating of a vehicle clutch and roll-back of a vehicle.

BACKGROUND

The statements in this section merely provide background information related to the present disclosure and may not constitute prior art.

A dual clutch transmission (DCT) is an automated manual transmission (AMT) which includes two clutches in the transmission. DCT transmits the rotational force input from the engine selectively to any one of two input shaft via the two clutches, and outputs the rotational force to a powertrain by adjusting a gear ratio of a gear set disposed on the two input shafts.

Unlike a typical automatic transmission (AT) using a torque-converter and multi-plate wet clutch, the DCT delivers engine torque using a dry clutch. Once this dry clutch is heated, it is difficult to cool. When the dry clutch is heated, the frictional characteristics thereof are markedly degraded, thereby lowering the efficiency of delivery of rotational force, and a fade-out phenomenon may occur therein, increasing the possibility of being burnt.

Accordingly, a vehicle employing the DCT requires control to prevent sustained heating of the clutch. When the vehicle is driven in a so-called "creep driving" fashion, the clutch temperature may increase. In particular, in a "creep hold" state, in which the clutch continuously slips but the vehicle cannot move, the temperature of the clutch may rapidly increase.

SUMMARY

The present disclosure provides a vehicle clutch control method for reducing heating of a clutch and roll-back of a vehicle by opening the clutch and operating a brake along an incline of road surface when the vehicle is in a creep hold state.

The present disclosure provides a vehicle clutch control method including: an incline detecting step of detecting an incline of a road surface when the vehicle is in a creep hold state; a first determining step of determining whether the detected incline is greater than a first set value; and a first control step of opening the clutch and operating an electronic stability program (ESP) brake when the incline is greater than the first set value.

The vehicle clutch control method may further include a mode determining step, for determining whether the vehicle is in the creep hold state, before the incline detecting step.

In the mode determining step, when a torque detected in the clutch is equal to or greater than a constant value and a vehicle speed is detected as 0, the vehicle may be determined to be in a creep hold state.

In the mode determining step, when the parking brake is turned ON, the vehicle may be determined to be in a normal state.

The vehicle clutch control method may further include a second determining step, for determining whether the incline is greater than a second set value, when the incline is equal to or smaller than the first set value as a result of performing the first determining step, wherein the second set value is set to be smaller than the first set value.

The vehicle clutch control method may further include a second control step of maintaining a slip state of the clutch when the incline is greater than the second set value.

The vehicle clutch control method may further include a third control step of opening the clutch when the incline is equal to or smaller than the second set value.

Further areas of applicability will become apparent from the description provided herein. It should be understood that the description and specific examples are intended for purposes of illustration only and are not intended to limit the scope of the present disclosure.

DRAWINGS

Figure 2:
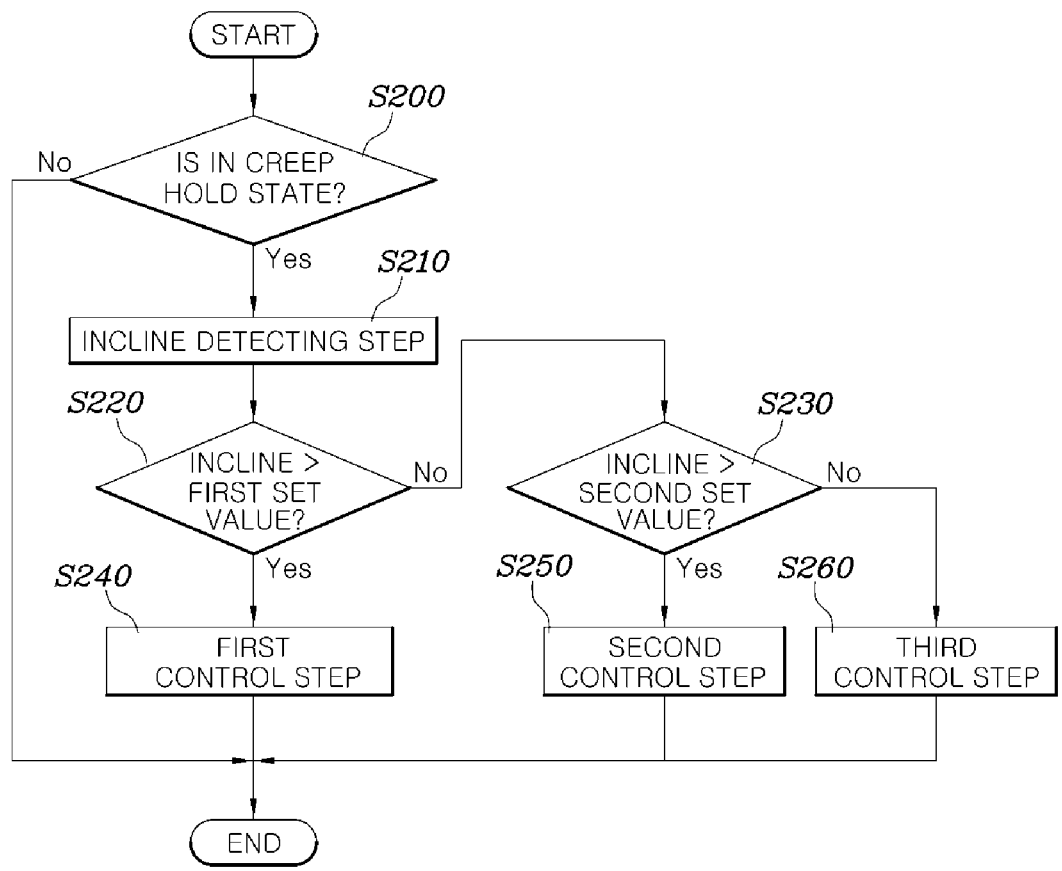

In order that the disclosure may be well understood, there will now be described various forms thereof, given by way of example, reference being made to the accompanying drawings, in which:

FIG. 1 is a block diagram illustrating a vehicle clutch control device according to one form of the present disclosure; and FIG. 2 is a flowchart illustrating a vehicle clutch control method according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for controlling a clutch of a vehicle according to various forms of the present disclosure will be described in detail with reference to the accompanying drawings.

FIG. 1 is a block diagram illustrating a vehicle clutch control device according to a form of the present disclosure. Referring to FIG. 1, the vehicle clutch control device includes an incline measuring sensor 113 for measuring the incline of the road surface, an electronic stability controller (ESC) 110 for receiving incline and vehicle speed information from a speed sensor 117 measuring a running speed of the vehicle, and a transmission control unit (TCU) 120 for detecting a torque applied to the clutch 123 and controlling the coupling of the clutch 123, wherein the TCU 120 receives parking brake ON information through a parking brake detecting sensor 125.

As the incline measuring sensor 113, an acceleration sensor or an incline sensor may be employed, and as the speed sensor 117, a wheel speed sensor may be employed.

The ESC 110 may communicate with the TCU 120, and the detailed control method thereof through the vehicle clutch control device according to the present disclosure will be described later.

FIG. 2 is a flowchart illustrating a vehicle clutch control method according to a form of the present disclosure. Referring to FIG. 2, the vehicle clutch control method may include an incline detecting step S120 for detecting the incline of the road surface when the vehicle is in the creep hold state; a first determining step S220 for determining whether the detected incline is greater than a first set value; and a first control step S240 for opening the clutch 123 and operating the ESP brake 115 when the incline is greater than the first set value.

For a vehicle to which the DCT is applied, when the gear is positioned at a D or R position, the vehicle is stopped, and the driver takes his/her foot off the brake pedal without pressing down the accelerator pedal, the clutch 123 enters a half clutch state, and the vehicle runs at a low speed with an idle rotational force. This is known as creep driving.

In particular, despite the delivery of sufficient torque to the clutch 123, when the vehicle is in the creep hold state, in which the vehicle is creep driving but is not moving forward, the temperature of the clutch 123 rapidly increases. In this case, the ESC 110 outputs a signal for opening the clutch 123 to the TCU 120 in order to inhibit the clutch from overheating. At this point, when the clutch 123 is opened in the state in which the vehicle is on an uphill road, the vehicle may roll back. In order to address this issue, the ESC 110 may output a clutch open signal to the TCU 120, and at the same time operate the ESP brake 115.

The first set value may be set to the incline of the road surface such that the roll-back of the vehicle is predicted, and is not limited to a specific numerical value because it may be variably set depending on the designer or the vehicle.

When it receives, from the TCU 120, a signal indicating the creep hold state of the vehicle, the ESC 110 measures the incline of the road surface using the incline measuring sensor 113 and determines whether the incline of the road surface is greater than the first set value. When the incline is greater than the first set value, the ESC 110 may determine that the vehicle is traveling on a steeply inclined road, and may thus output a signal directing opening of the clutch 123 to the TCU 120, and at the same time, inhibit the roll-back of the vehicle by operating the ESP brake 115.

The present disclosure may further include a mode determining step S200 for determining that the vehicle is in the creep hold state before the incline detecting step S210, and it may be determined that the vehicle is in the creep hold state in the mode determining step S200, when the torque detected by the clutch 123 is a constant value and the vehicle speed is detected as 0.

Typically, the creep hold state refers to the state where the clutch 123 continuously slips but the vehicle does not move.

In other words, when it receives, from the TCU 120, a signal that the clutch 123 detects a torque equal to or greater than the constant value, the ESC 110 determines that a sufficient amount of torque necessary for creep driving is being delivered from the engine, and detects the vehicle speed using the speed sensor 117 in order to determine whether the vehicle is in the creep hold state. The constant value may be set to a torque value that is sufficient for the clutch 123 to perform creep driving, and may be changed by the vehicle designer.

At this point, when the detected vehicle speed is 0, the vehicle is determined to be in the creep hold state and the incline of the road surface is measured by the incline measuring sensor 113 in order to inhibit heating due to continuous slippage of the clutch 123 and the roll-back of the vehicle. On the other hand, when the detected vehicle speed is greater than 0, it is determined that creep driving is being normally performed, and control logic may be terminated.

In addition, in the mode determining step S200, when the parking brake is in an ON state, the vehicle is determined to be in a normal state.

The vehicle may enter the creep hold mode according to the incline of the road surface, but may also enter the creep hold mode when the parking brake is in the ON state. This is because the vehicle does not move forward when the parking brake is in the ON state, even if sufficient torque is delivered to the clutch 123. Accordingly, when the vehicle is determined to be in the creep hold state, control for determining the incline of the road surface to inhibit roll-back may be unnecessarily performed. Accordingly, in the mode determining step S200, whether the parking brake is in the ON state is detected by the parking brake detecting sensor 125, and, when the parking brake is in the ON state, the control logic is terminated, thereby avoiding unnecessary control.

At this point, the control unit 120 may transmit a signal depending on whether the parking brake is in the ON state to the ESC 110 and determine whether the vehicle is in the creep hold state on the basis of the corresponding signal.

Furthermore, as a result of the first determining step S220, when the incline is equal to or smaller than the first set value, a second determining step S230 is further performed for determining whether the incline is greater than the second set value, and the second set value may be set lower than the first set value.

When the incline is greater than the second set value, a second control step S250 may be further performed for maintaining the slip state of the clutch 123.

For example, when the incline of the road surface measured by the incline measuring sensor 113 is equal to or smaller than the first set value, since the vehicle is not on a steep ramp, the clutch 123 may not be heated more than the case where the road has a steep incline, even though the slippage of the clutch 123 is continuously maintained. Accordingly, when the road surface is not steep, the roll-back of the vehicle due to opening the clutch 123 may be inhibited by continuously slipping the clutch 123 to induce coupling of the clutch 123.

In addition, when the incline is equal to or smaller than the second set value, a third control step S260 for opening the clutch 123 may be further performed.

In other words, when the incline of the road surface is detected to be equal to or smaller than the second set value, the ESC 110 determines that the road is not inclined and opens the clutch 123 to inhibit the clutch 123 from being heated.

When the vehicle is determined to be in the creep hold state even though the incline of the road surface is equal to or smaller than the second set value, this is either the case where the vehicle is blocked by an obstacle, or the case where the vehicle is in the creep hold state because the ON signal of the parking brake is not transmitted to the ESC 110 due to failure of the parking brake detecting sensor 125, even though the parking brake is in the ON state.

Accordingly, although the driver has engaged the parking brake, when the ESC 110 diagnoses that the vehicle is in the creep hold state, the parking brake detecting sensor 125 may have failed. Accordingly, the parking brake detecting sensor 125 may be more efficiently maintained.

According to the clutch control method of a vehicle having the above-described structure, burning of the clutch may be inhibited and frictional characteristics may be maintained by inhibiting the clutch from continuously slipping and heating due to running in a creep hold state of the vehicle.

In addition, a roll-back phenomenon of the vehicle may be inhibited by operating an ESP brake when the vehicle is traveling on an inclined road surface, so that the clutch may be opened on such an inclined surface.

Although the various forms of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A vehicle clutch control method comprising:
    an incline detecting step of detecting an incline of a road surface when a vehicle is in a creep hold state;
    a first determining step of determining whether the detected incline is greater than a first set value; and
    a first control step of opening a clutch and operating an electronic stability program (ESP) brake when the incline is greater than the first set value.

2. The vehicle clutch control method according to claim 1, further comprising a mode determining step of determining whether the vehicle is in the creep hold state, before the incline detecting step.

3. The vehicle clutch control method according to claim 2, wherein in the mode determining step, when a torque detected in the clutch is equal to or greater than a constant value and a vehicle speed is detected as 0, the vehicle is determined to be in a creep hold state.

4. The vehicle clutch control method of claim 2, wherein, in the mode determining step, when a parking brake that is a braking device provided in the vehicle separately from the ESP is turned ON, the vehicle is determined to be in a normal state.

5. The vehicle clutch control method of claim 1, further comprising a second determining step of determining whether the incline is greater than a second set value, when the incline is equal to or smaller than the first set value as a result of performing the first determining step, wherein the second set value is set to be smaller than the first set value.

6. The vehicle clutch control method of claim 5, further comprising a second control step of maintaining a slip state of the clutch, when the incline is greater than the second set value.

7. The vehicle clutch control method of claim 5, further comprising a third control step of opening the clutch, when the incline is equal to or smaller than the second set value.

* * * * *